United States Patent [19]

Oguni et al.

[11] 4,155,530
[45] May 22, 1979

[54] BRAKE TUBE PROTECTOR FOR USE IN VEHICLES

[75] Inventors: Yasuo Oguni; Yasuhiro Morita, both of Toyota; Yukitomo Sanada, Okazaki, all of Japan

[73] Assignee: Toyota Jidosha Kogyo Kabushiki Kaisha, Toyota, Japan

[21] Appl. No.: 817,809

[22] Filed: Jul. 21, 1977

[30] Foreign Application Priority Data

Jan. 17, 1977 [JP] Japan .................................. 52-4132

[51] Int. Cl.² .......................... F16L 3/08; F16L 57/00
[52] U.S. Cl. .................................. 248/74 R; 138/110
[58] Field of Search ............... 248/65, 72, 74 R, 74 B, 248/74 PB, 75, 68 R, 49, 219.4, 229, 230; 138/110; 137/351, 354, 355, 377; 180/DIG. 1, 82 R; 285/137 R, 137 A, 62; 301/124 R, 125; 74/607

[56] References Cited

U.S. PATENT DOCUMENTS

| | | | |
|---|---|---|---|
| 1,315,225 | 9/1919 | Hughes | 248/49 X |
| 1,668,953 | 5/1928 | Erickson | 248/74 R X |
| 2,177,128 | 10/1939 | Johnson | 248/49 X |
| 2,334,706 | 11/1943 | Ingalls | 248/74 B X |
| 2,829,190 | 4/1958 | Comlossy | 248/49 X |
| 3,346,688 | 10/1967 | Fields | 248/74 PB X |
| 3,434,682 | 3/1969 | Nestlerode | 248/68 R |
| 3,843,110 | 10/1974 | Smith | 248/49 X |
| 3,853,148 | 12/1974 | De Vincent et al. | 248/74 R X |

FOREIGN PATENT DOCUMENTS

| | | | |
|---|---|---|---|
| 736735 | 11/1932 | France | 248/74 R |
| 1131413 | 2/1957 | France | 248/74 R |
| 1149550 | 4/1969 | United Kingdom | 248/65 |

*Primary Examiner*—Rodney H. Bonck
*Attorney, Agent, or Firm*—Browdy and Neimark

[57] ABSTRACT

A brake tube protector for use in vehicles to protect the brake tube, which is led or arranged axially along the external periphery of the rear axle housing, from being damaged by impact with or striking by other members or materials. The protector is made of an elongated rectangular steel plate by press-working in such a manner as to form a pair of parallel longitudinal ribs on both sides thereof and thereby to be of substantially Roman M letter configuration in its cross-sectional view, and is to efficiently protect the brake tube which is accommodated in a channel formed between the pair of ribs.

5 Claims, 5 Drawing Figures

U.S. Patent May 22, 1979 4,155,530
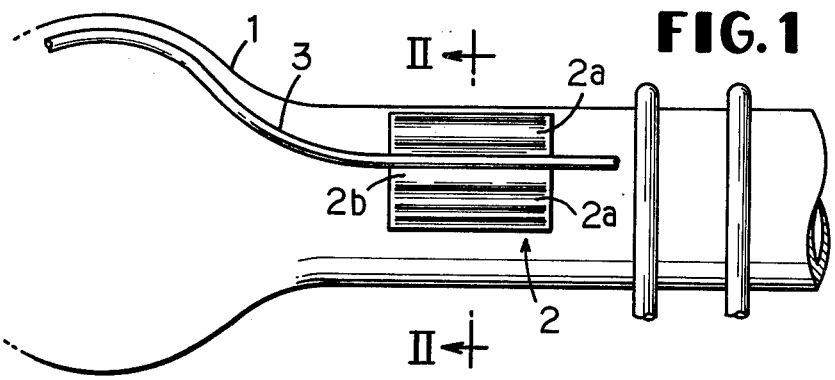
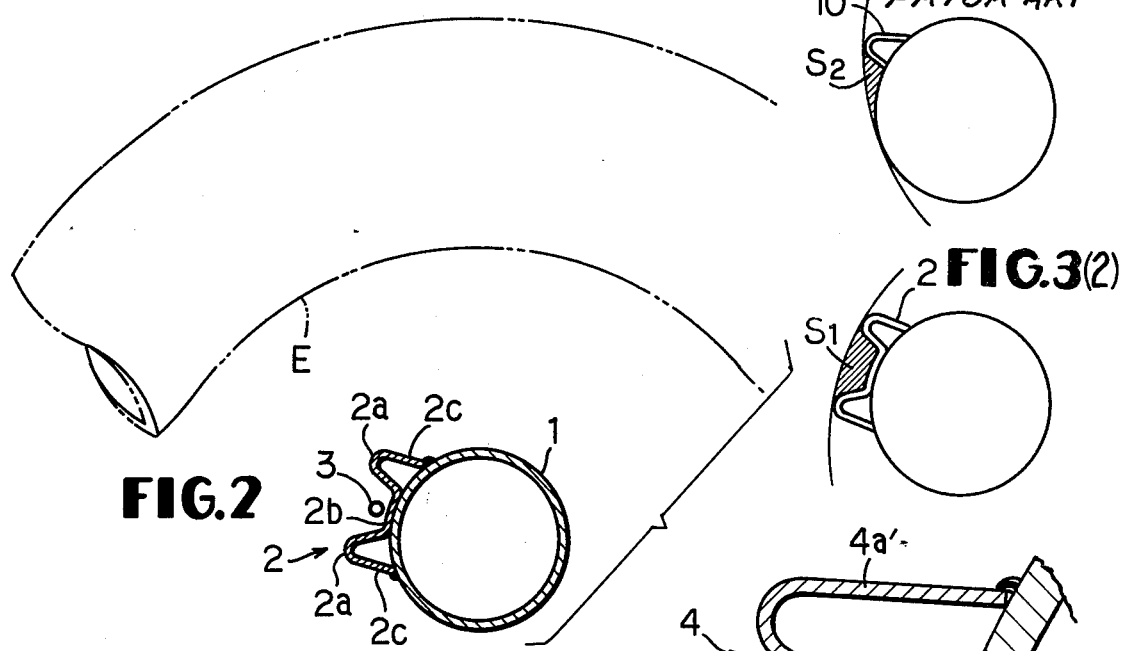
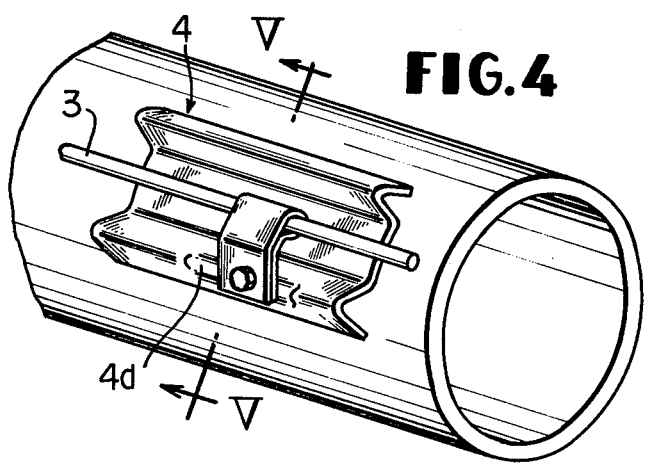
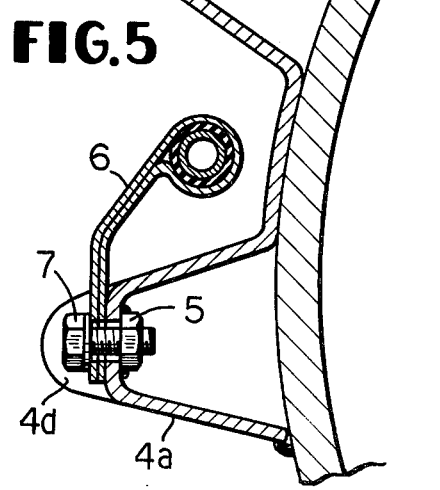

BRAKE TUBE PROTECTOR FOR USE IN VEHICLES

BACKGROUND OF THE INVENTION

This invention relates to a protector of the brake tube for use in vehicles, and more particularly pertains to a protector of the brake tube, which is usually led in a longitudinal direction along the external periphery of the rear axle housing, for safeguarding or sheltering the brake tube from being damaged by any kind of outside impulse such as a hitting by the exhaust pipe.

The brake tube for the purpose of supplying hydraulic oil to the brakes for the rear wheels of a vehicle is mostly led along the rear axle housing; and in most cases an exhaust pipe for the exhaust gas from the engine is fitted over the abovementioned housing. And the brake tube is subject to various kinds of possible damages as described hereunder.

Since the exhaust pipe is usually suspended from the chassis or the car body with a string-like material such as rubber card, it is liable to swing with a considerable amplitude when the vehicle is driven on a rough road, thereby interferring with the rear axle housing which may severely vibrate together with the rear wheels. Sometimes the string-like material is so deteriorated during prolonged use that it may be fractured so as to cause the exhaust pipe to fall down onto the rear axle housing.

In the event of such cases the brake tube is often squashed by the exhaust pipe, and even fractured in some worse conditions inviting the serious danger of loss of braking. For the purpose of avoiding such troubles, a brake tube safeguarding protector has been attached to the portion, immediately below the exhaust pipe, of the rear axle housing.

Investigation by the inventor of this problem proved that the conventional protector is insufficient in its protecting capability. The reasons are as follows:

(1) A conventional protector of inverted V-shape cross-section, which is formed of a plate member, is welded on the rear axle housing simply to make a longitudinal rib, along whose foot the brake tube is led;

(2) This type of protector can only be expected to protect the brake tube from the damage due to the exhaust pipe falling down from above while maintaining its horizontal posture;

(3) The rear axle housing is in actual cases susceptible to various different types of impulse, because the exhaust pipe may fall down not necessarily in a horizontal posture, and even the rear axle housing itself may bounce up and down and sometimes its motion is accompanied by rotative movement.

Another important factor of damaging the brake tube is attributable to corrosion of the exhaust pipe due to an inevitable temperature elevation of the exhaust gases. The use of some catalysts, in recent years, for the purpose of eliminating the poisonous substances from the exhaust gases raises the temperature of the same and thereby accelerates the corrosion not only of the string-like material for suspending the exhaust pipe but also of the pipe itself so badly as to cause it to fall down.

In such a case the falling down of the damaged exhaust pipe takes a more complicated form and thereby causes various dangerous happenings. Furthermore, the rear axle housing and the exhaust pipe can hit or interfere with one another even in the course of vehicle assembling due to inadvertent work of assembling workers or some other causes. Considerations for the protection of the brake tube must be paid so as to reduce the probability of or completely avoid damage on account of such causes.

As aforementioned the rear axle housing is badly subjected to the danger of being damaged by hitting of the exhaust pipe from various angles and in many complicated forms, and thus the brake tube which is led or laid down along the external periphery of the rear axle housing is liable to be damaged. Improvement of such a poor protection state for the brake tube has been an urgent matter remaining unsolved.

SUMMARY OF THE INVENTION

This invention, in brief, has been completed based on a thorough investigation of the weak points characteristic of conventional protectors and to provide a novel protector suitable for rational design, rigid construction, and convenience in use.

It is therefore an object of this invention to provide a brake tube protector prominent in safeguarding or sheltering the brake tube, especially those which are led to the rear wheels.

It is another object of this invention to provide a brake tube protector which is rational and rigid in its construction.

It is still another object of this invention to provide a brake tube protector easy to manufacture and thereby economical in production.

It is a further object of this invention to provide a brake tube protector convenient in fixing the same in its intended place.

BRIEF DESCRIPTION OF THE DRAWINGS

These and other objects as well as advantages of this invention will be more apparent from the following description taken in conjunction with the accompanying drawings in which:

FIG. 1 is a somewhat schematic view of an embodiment of the present invention, seen from the rear side of a vehicle;

FIG. 2 is a cross-sectional view of FIG. 1 taken along the line II—II.

FIGS. 3(1) and 3(2) are respective explanatory views for making comparison of the area to be sheltered between the conventional protector illustrated in FIG. 3(1), and that of the present invention, shown in FIG. 3(2);

FIG. 4 is a perspective view of another embodiment; and

FIG. 5 is a cross-sectional view of FIG. 4 taken along the line V—V.

Referring to the drawings in FIGS. 1 and 2, a protector 2 is seen welded on the external periphery of a rear axle housing 1, which protector being made of a rectangular steel plate bend-processed on opposite sides thereof such that a pair of triangular ribs 2a are formed on either side. The triangular ribs 2a are parallel to each other and contains therebetween a channel or groove 2b, so a cross-sectional view of the protector 2 is almost of Roman M letter shape. The protector 2 is secured by welding on the external periphery of the rear axle housing 1 in such a manner that the channel 2b be parallel to the axis of the housing 1 and outwardly open; the welding on the housing 1 is carried out longitudinally at each outer side foot 2c of the ribs 2a.

The abovementioned protector 2(a) can be processed quite easily by a press, (b) can be welded, just like in the conventional one, only at two places, (c) can be of rigid and strong construction because of the presence of the triangular sections of the ribs in combination with the wall of the rear axle housing 1, and (d) can form a spacious and well sheltered space $S_1$ or channel 2b of a channel shape between the ribs 2a, which space $S_1$ is far deeper and wider than the safeguard space $S_2$ of the conventional protector 10, as can be seen on the cross-sectional view in FIG. 3. Spaces $S_1$ and $S_2$ are shown by hatching.

Merits and features of this embodiment induced from the above explanation will be summarized hereunder. The brake tube 3 accommodated in this channel 2b is protected by virtue of being in a deeper and better sheltered place. Because of the larger cross-sectional area of the channel 2b, the brake tube 3 laid or led therein can hardly be off the space $S_1$, even if the precision of attaching the brake tube in place should be more or less unsatisfactory, which perfectly protects the brake tube 3 from being directly hit by foreign or outside matters such as exhaust pipe E, as shown in FIG. 2. Because of the rigid construction of the ribs 2a and the deepness of the channel 2b sandwiched by the ribs, deformation of the ribs 2b may be well prevented even when any kind of hit occurs, and furthermore direct striking contact of the outside matters to the brake tube 3 can be almost evaded when a slight deformation should arise in the ribs 2b.

In another embodiment illustrated in FIGS. 4 and 5, the protector 4 is similar in general to the previous one except that it can concurrently serve as a bracket for a clamp for retaining the brake tube 3.

Describing more in detail, one of the two ribs 4a, 4a', in this case 4a taken for example, is partially pressed flat at the crest portion thereof to form a recess 4d, or a slightly stepped down portion at a side view. In the recess 4d there is a through-bore with a nut 5 welded at the inner end thereof, which enables the clamp 6 for retaining the brake tube 3 to be secured to the protector 4 by means of a bolt 7. This recess 4d may be easily formed by a press for providing a flat portion to the clamp 6; it is also effective in restraining the clamp 6 and the bolt 7 from exceeding in height or rising above the upper level of the sheltered space formed by the ribs 4a and 4a'.

As to the fixing of the clamp 6, the rib 4a', located at the upper side in the figure, may be chosen instead of 4a, located at the under side in this embodiment.

For concluding the description some additional comments will be made: Although this protector has originally been devised for protecting the brake tube from being hit by the exhaust pipe, it is of course very effective in preventing any other outside matters from hitting the brake tube. Irrespective of such a simple construction, that is, processing a rectangular steel plate bent into an M letter shape, in its cross-sectional configuration, and securing it at a desired place on the rear axle housing, this invention is highly effective in positively protecting the brake tube from the outside impulse such as the hitting by the exhaust pipe and consequently in enhancing the safety of vehicle driving.

It will be obvious to those skilled in the art that various changes may be made without departing from the scope of the present invention and the present invention is not to be considered limited to what is shown in the drawings and described in the specification.

What is claimed is:

1. A brake tube protector for use in vehicles, the protector comprising (1) an elongated, rectangular, bent steel plate, having a pair of parallel ribs on either side thereof, each said rib having an apex; (2) a channel formed between said pair of ribs for accomodating the brake tube therein in axial direction, said brake tube being located in said channel in a position lower than said apexes and spaced above its bottom; and (3) means for securing said protector on the external periphery of a rear axle housing of a vehicle with said groove outwardly open to accomodate and protect the brake tube against outside blows and impacts, each of said pair of ribs forming respectively a respective triangle section in combination with the wall of said housing, and including at least one clamp member, wherein at least one of said ribs is provided with a flat, recess portion providing at its bottom wall a seat for fastening said clamp member for said brake tube, said clamp member including a clamping means for fixing said tube in said channel and above its bottom.

2. A brake tube protector for use in vehicles as set forth in claim 1, wherein each of said ribs has an outer side foot and said means for securing comprise said outer side foot of each said rib which feet are to be welded on the external periphery of the rear axle housing.

3. A brake tube protector according to claim 2, including additionally a rear axle housing and welds extending along each of said outer feet fixing said protector to said housing.

4. A brake tube protector according to claim 1, including additionally a rear axle housing, said means for securing comprising means fixing said protector to said housing.

5. A brake tube protector according to claim 1, including a nut and a bolt fixing said clamp member to said flat, recess portion, and wherein said clamp member includes a metallic member having two ends, each of which is secured to said flat, recess portion with said nut and said bolt, said metallic member defining a substantially circular opening comprising said clamping means and a resilient member positioned between said brake tube and said metallic member.

* * * * *